(12) United States Patent
Lin et al.

(10) Patent No.: US 8,934,681 B2
(45) Date of Patent: Jan. 13, 2015

(54) METHOD FOR DETECTING OBJECT ON AN OPERATION INTERFACE OF A TOUCHABLE DEVICE AND TOUCHABLE DEVICE USING THE SAME

(75) Inventors: Yao-Hsuan Lin, Hsinchu County (TW); Chih-Yen Wu, Hsinchu County (TW)

(73) Assignee: Pixart Imaging Inc., Hsinchu County (TW)

( * ) Notice: Subject to any disclaimer, the term of this patent is extended or adjusted under 35 U.S.C. 154(b) by 374 days.

(21) Appl. No.: 13/286,805

(22) Filed: Nov. 1, 2011

(65) Prior Publication Data

US 2012/0212452 A1    Aug. 23, 2012

(30) Foreign Application Priority Data

Feb. 23, 2011    (TW) .............................. 100106056 A (51) Int. Cl.
*G06K 9/00* (2006.01)
*G06F 3/042* (2006.01)
*G06F 3/041* (2006.01)

(52) U.S. Cl.
CPC ............ *G06F 3/0425* (2013.01); *G06F 3/0418* (2013.01)
USPC ............................. 382/124; 345/163; 345/175

(58) Field of Classification Search
USPC ............................. 345/163, 175, 204; 382/124
See application file for complete search history.

(56) References Cited

U.S. PATENT DOCUMENTS

| | | | |
|---|---|---|---|
| 6,243,054 B1 * | 6/2001 | DeLuca | 345/7 |
| 7,590,589 B2 * | 9/2009 | Hoffberg | 705/37 |
| 7,629,967 B2 * | 12/2009 | Newton | 345/173 |
| 7,671,756 B2 * | 3/2010 | Herz et al. | 340/669 |
| 7,719,367 B2 * | 5/2010 | Krah | 331/18 |
| 7,831,070 B1 * | 11/2010 | Cheng et al. | 382/124 |
| 7,895,439 B2 * | 2/2011 | Stone | 713/176 |
| 8,471,837 B2 * | 6/2013 | Vu et al. | 345/204 |
| 8,495,733 B1 * | 7/2013 | Cheng et al. | 726/22 |
| 2002/0067845 A1 * | 6/2002 | Griffis | 382/107 |
| 2006/0241864 A1 * | 10/2006 | Rosenberg | 701/213 |
| 2007/0226656 A1 * | 9/2007 | Zwart | 715/856 |
| 2008/0266257 A1 * | 10/2008 | Chiang | 345/163 |
| 2009/0164702 A1 * | 6/2009 | Kern | 711/103 |
| 2010/0085169 A1 * | 4/2010 | Poupyrev et al. | 340/407.2 |
| 2012/0212452 A1 * | 8/2012 | Lin et al. | 345/175 |

* cited by examiner

*Primary Examiner* — Gregory M Desire
(74) *Attorney, Agent, or Firm* — Muncy, Geissler, Olds & Lowe, P.C.

(57) ABSTRACT

A method for detecting an object and a touchable device are presented, which is capable of detecting an object having a fingerprint feature on an operation interface of the touchable device. An image sensor is used for acquiring acquiring an image on the operation interface, and the acquired image is converted into a signal denoted in a frequency domain by using a frequency conversion function. Signals at a medium-high frequency (MHF) signal region among the signals of the frequency domain are analyzed, so as to generate a first signal and a second signal according to a distribution of the signals of the frequency domain. The first signal indicates existence of the object on the operation interface, and the second signal indicates inexistence of the object on the operation interface.

20 Claims, 9 Drawing Sheets

METHOD FOR DETECTING OBJECT ON AN OPERATION INTERFACE OF A TOUCHABLE DEVICE AND TOUCHABLE DEVICE USING THE SAME

CROSS-REFERENCE TO RELATED APPLICATIONS

This non-provisional application claims priority under 35 U.S.C. §119(a) on Patent Application No(s). 100106056 filed in Taiwan, R.O.C. on Feb. 23, 2011, the entire contents of which are hereby incorporated by reference.

BACKGROUND OF THE INVENTION

1. Field of Invention

The disclosure relates to a touchable device, and more particularly to a method for detecting an object and a touchable device.

2. Related Art

Computers are becoming more prevalent nowadays. In order to exchange information with the computer or perform functions on the computer, people often input Information or instructions are inputted to a computer using various input devices to exchange information with the computer or perform functions on the computer. The common input device includes a mouse, a key board, and a touch pen.

Keyboards are used to operate or control computers before mice are invented. After Douglas Englebart invented the first mouse in Calif. in 1968, users begin to operate computers using mice having a button and a scroll wheel on the mouse without inputting complicated instructions through the keyboard.

The computer industry has developed rapidly in recent years. For the convenience of use and carry of the computer, an optical mouse or a touchable mouse is developed in place of a mechanical mouse.

In the configuration of a touchable mouse, a light source for example, a light emitting diode (LED), configured inside a body of the mouse, irradiates an operation interface. An image sensor then retrieves a finger image on the operation interface, and successively retrieved changes of the finger image are converted into a displacement amount through a corresponding image processing mechanism. The displacement amount is appropriately reflected in an amount of movement and a direction of a cursor on a computer screen. However, since an image of the external environment may also be retrieved by the image sensor, track misjudgment or jitters may occur.

SUMMARY OF THE INVENTION

In view of the above problems, a method for detecting an object and a touchable device is disclosed, so as to solve the problems in the prior art.

An embodiment of the disclosure provides a method for detecting an object applicable to a touchable device. The method for detecting the object is used for detecting an object having a fingerprint feature and placed on an operation interface of the touchable device.

The method for detecting the object comprises: acquiring, by an image sensor of the touchable device, an image on the operation interface; converting the retrieved image into a signal in a frequency domain by using a frequency conversion function; and generating a first signal and a second signal according to a distribution of the signals of the frequency domain in a medium-high frequency (MHF) signal region.

The first signal indicates existence of the object on the operation interface, and the second signal indicates inexistence of the object on the operation interface.

An embodiment of the present disclosure provides a touchable device, where the touchable device comprises an operation interface, an image sensor, a processor, and a track detector.

The image sensor is configured corresponding to the operation interface. The processor is connected to the image sensor. A displacement sensor is connected to the processor. The image sensor is used for acquiring an image on the operation interface. The processor determines whether an object exists on the operation interface by analyzing frequency components of the image acquired by the image sensor. The track detector can detect a movement track of the object on the operation interface.

An embodiment of the disclosure provides a touchable device, where the touchable device comprises an operation interface, an image sensor, and a processor.

The image sensor is configured corresponding to the operation interface, the processor is connected to the image sensor, and a displacement sensor is connected to the processor. The image sensor is used for acquiring an image on the operation interface. The processor determines whether an object having a fingerprint feature exists on the operation interface by analyzing frequency components of the image retrieved by the image sensor, and calculates a displacement amount of the object by using the retrieved image when the object exists on the operation interface.

Moreover, a distribution of the signals can be determined by calculating energy or the number of signals in an MHF signal region and comparing the calculated value with a preset threshold value.

In conclusion, the method for detecting the object and the touchable device according to the embodiments can be used for detecting the object on the operation interface of the touchable device, thereby avoiding track jitters caused by the external environment. Moreover, through the method for detecting the object and the touchable device according to the embodiments, the output of the displacement amount corresponding to the movement of the object (that is, detected track information) can be controlled according to whether the object exists on the operation interface.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features of the disclosure. It will be appreciated that these drawings depict only preferred embodiments of the invention and are not intended to limits its scope. The invention will be described and explained with additional specificity and detail through the use of the accompanying drawings in which.

DETAILED DESCRIPTION OF THE INVENTION

The detailed features and advantages of the disclosure are described below in great detail through the following embodiments, and the content of the detailed description is sufficient for those skilled in the art to understand the technical content of the disclosure and to implement the disclosure there accordingly. Based upon the content of the specification, the claims, and the drawings, those skilled in the art can easily understand the relevant objectives and advantages of the disclosure. The following embodiments are intended to describe the disclosure in further detail, but not intended to limit the scope of the disclosure in any way.

Figure 1:
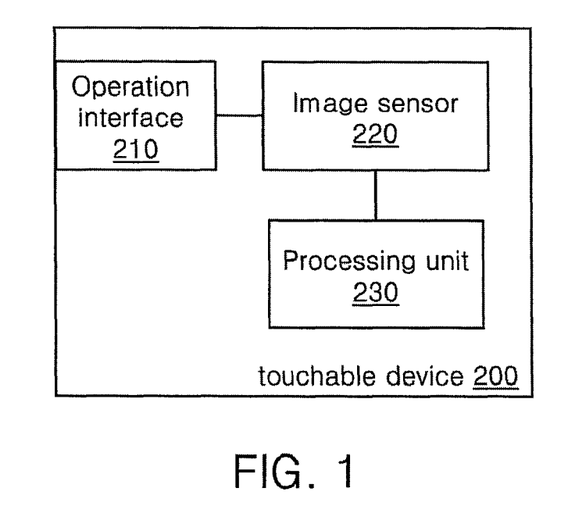
FIG. 1 is a schematic structural view of a touchable device according to a first embodiment of the disclosure.

FIG. 1 is a schematic structural view of a touchable device according to a first embodiment of the disclosure.

Referring to FIG. 1, a touchable device 200 comprises an operation interface 210, an image sensor 220, and a processor 230. The image sensor 220 is configured corresponding to the operation interface 210, and the processor 230 is connected to the image sensor 220.

The image sensor 220 is used for acquiring an image on the operation interface 210. The processor 230 determines whether an object having a fingerprint feature exists on the operation interface 210 by analyzing frequency components of the image acquired by the image sensor 220.

Here, the touchable device 200 detects whether the object exists and detect a movement track of the object using a single processor 230.

In other words, during normal operation, the processor 230 calculates a displacement amount of the object by using the image acquired by the image sensor 220.

Figure 2A:
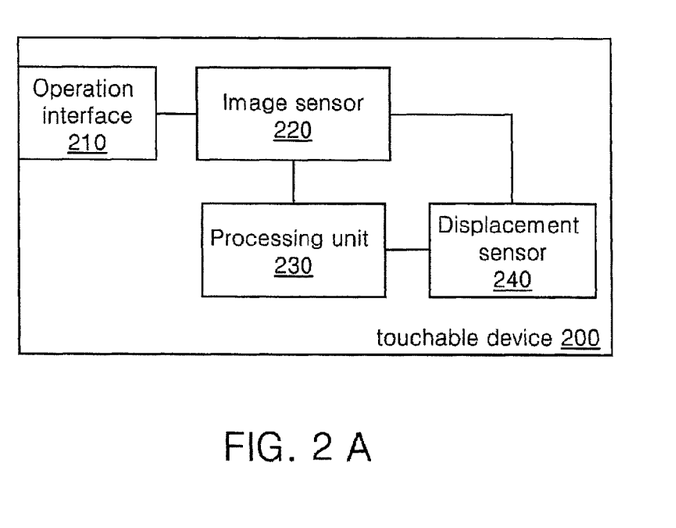
FIG. 2A is a schematic structural view of a touchable device according to a second embodiment of the disclosure.

Moreover, referring to FIG. 2A, the touchable device 200 also detects whether the object exists with the processor 230. Furthermore, a track detector is configured, for example, a displacement sensor 240 is connected to the processor 230, and the touchable device 200 detects the movement track of the object with the displacement sensor 240.

That is to say, during normal operation, the displacement sensor 240 detects the movement track of the object through the image acquired by the image sensor 220 and generates a displacement amount corresponding to the movement track of the object.

Here, the touchable device 200 detects whether the object exists by using the method for detecting the object.

Figure 2B:
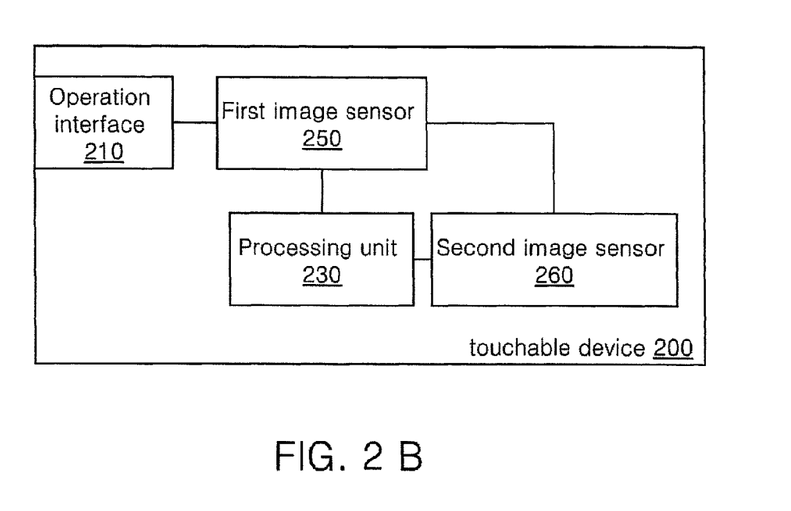
FIG. 2B is a schematic structural view of a touchable device according to a third embodiment of the disclosure.

Referring to FIG. 2B, a touchable device 200 comprises an operation interface 210, a first image sensor 250, a second image sensor 260, and a processor 230. The first image sensor 250 is configured corresponding to the operation interface 210, and the processor 230 is connected to the first image sensor 250 and the second image sensor 260 respectively. In this embodiment, a track detector is the second image sensor 260.

The first image sensor 250 is used for acquiring an image on the operation interface 210. The processor 230 determines whether a object having a fingerprint feature exists on the operation interface 210 by analyzing frequency components of the image acquired by the first image sensor 250. The second image sensor 260 senses a movement track of the object according to the image acquired by the first image sensor 250, and generates a corresponding control signal to the displacement processor 230 to generate a corresponding movement track. The second image sensor 260 obtains a corresponding image signal acquired by the first image sensor 250 through the connection to the first image sensor 250 or through the processor 230.

Figure 3:
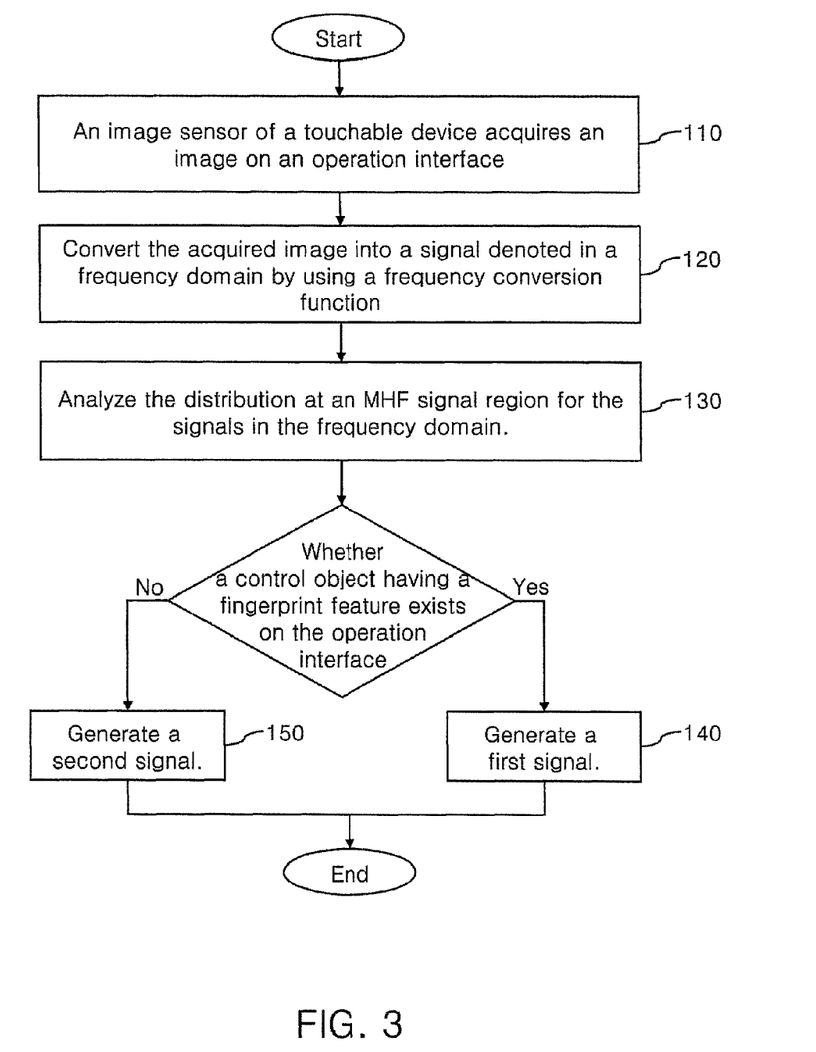
FIG. 3 is a flow chart of a method for detecting an object according to a first embodiment of the disclosure.

Referring to FIG. 3, first, the image sensor 220 of the touchable device 200 retrieves an image on the operation interface 210 (Step 110). Next, the acquired image is transferred to the processor 230, so the processor 230 analyzes frequency components of the image. Here, the processor 230 converts the image acquired by the image sensor 220 into a signal in a frequency domain by using a frequency conversion function (Step 120), then analyzes the distribution at an MHF signal region for the signals in the frequency domain (Step 130), and generates a first signal or a second signal according to a distribution of the signals of the frequency domain (Step 140 or 150).

The first signal indicates that the object exists on the operation interface 210, and the second signal indicates that the object does not exist on the operation interface 210. Here, the object may be a finger. The frequency conversion function may be a Discrete Fourier Transform (DFT) function, a Discrete Cosine Transform (DCT) function or a Discrete Wavelet Transform (DWT) function.

Also, when the object does not exist on the operation interface 210, the touchable device 200 does not output the displacement amount corresponding to the movement track of the object. In contrast, when the object exists on the operation interface 210, the touchable device 200 outputs the displacement amount corresponding to the movement track of the object.

Figure 4:
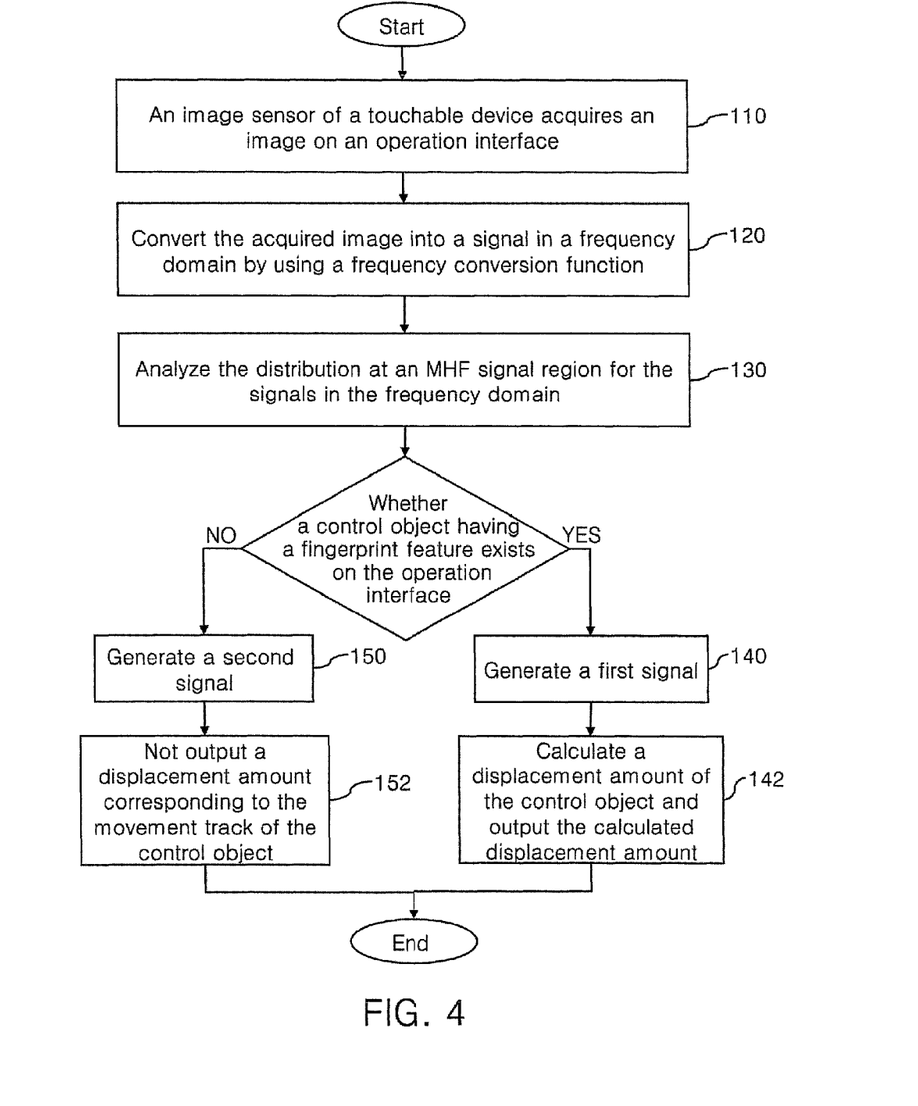
FIG. 4 is a flow chart of a method for detecting an object according to a second embodiment of the disclosure.

In other words, referring to FIG. 4, when the object exists on the operation interface 210, the processor 230 calculates the displacement amount of the object by using the image acquired by the image sensor 220 in response to the first signal, and outputs the calculated displacement amount to enable a cursor on a display (not shown) to move accordingly (Step 142). When the object does not exist on the operation interface 210, the processor 230 does not calculate the displacement amount of the object in response to the second signal or does not output the calculated displacement amount, so the touchable device 200 does not output the displacement amount corresponding to the movement track of the object (Step 152).

Figure 5:
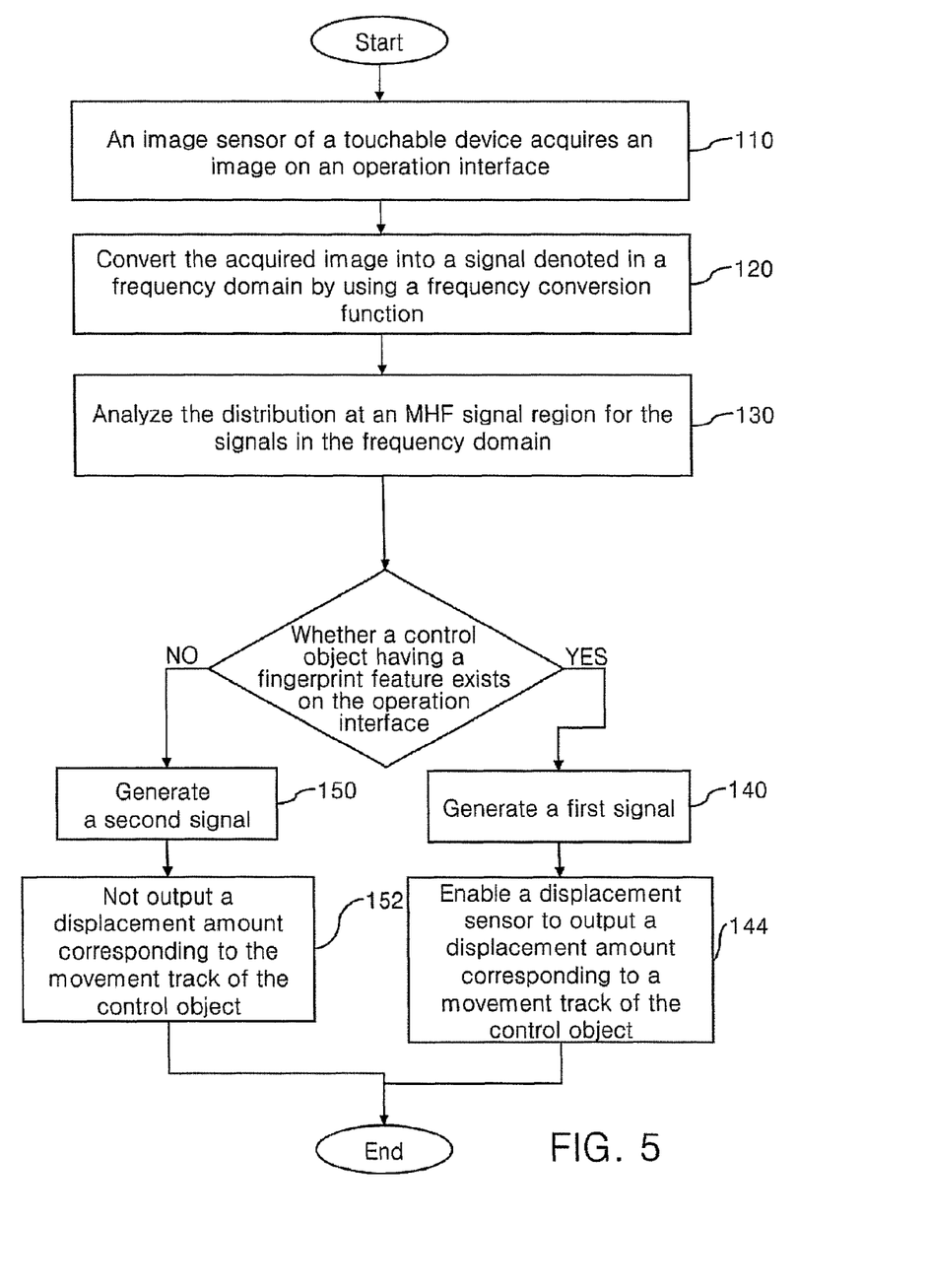
FIG. 5 is a flow chart of a method for detecting an object according to a third embodiment of the disclosure.

For the touchable device 200 that the displacement sensor 240 is used as the track detector, referring to FIG. 5, when the object exists on the operation interface 210, the processor 230 enables the displacement sensor 240 to output the displacement amount corresponding to the movement track of the object according to the first signal (Step 144). When the object does not exist on the operation interface 210, the processor 230 stops the operation of the displacement sensor 240 or interrupt the output of the displacement sensor 240 according to the second signal, so the touchable device 200 does not output the displacement amount corresponding to the movement track of the object (Step 152). For the touchable device 200 that the second image sensor 260 is used as the track detector, when the object exists on the operation interface 210, the processor 230 uses the first signal to enable the second image sensor 260 to output the movement track of the object, and then calculates the displacement amount according to the movement track of the object.

Here, the distribution of the signals in the MHF signal region can be determined by calculating energy or the number of the signals in the MHF signal region and comparing the calculated value with a preset threshold value.

Figure 6:
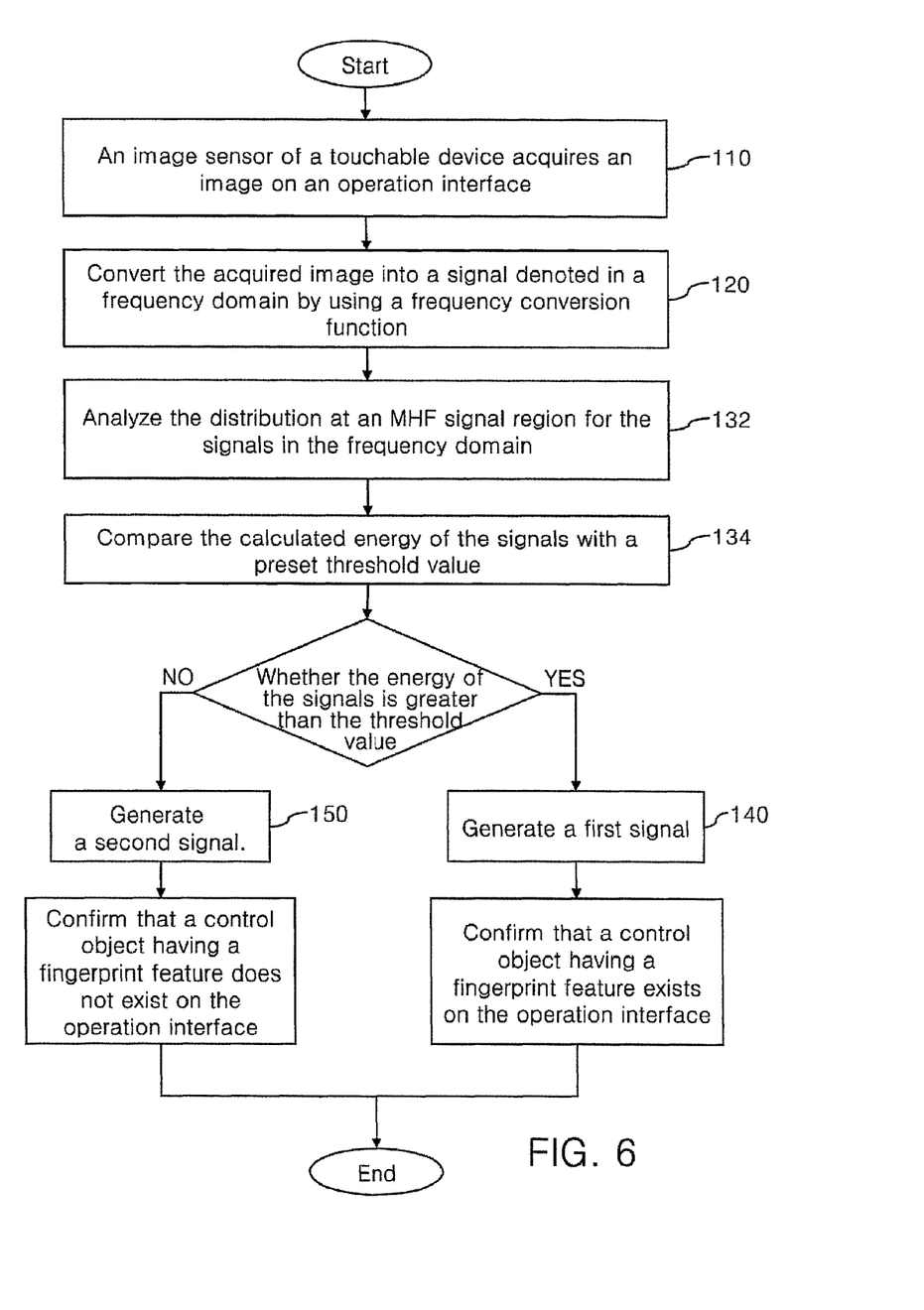
FIG. 6 is a flow chart of a method for detecting an object according to a fourth embodiment of the disclosure.

For the calculation of the energy of the signals in the MHF signal region, referring to FIG. 6, the processor 230 can calculate the energy of the signals located at the MHF signal region (Step 132) and compare the calculated energy of the signals with the preset threshold value (Step 134). When the energy of the signals is greater than the threshold value, the first signal is generated (Step 140), that is, the processor 230 determines that the object exists on the operation interface, so displacement detection corresponding to the image is performed normally. When the energy of the signals is not greater than the threshold value, the second signal is generated (Step 150), that is, the processor 230 determines that the object does not exist on the operation interface, so the displacement detection corresponding to the image is stopped or the output of the detected displacement amount is stopped.

Figure 7:
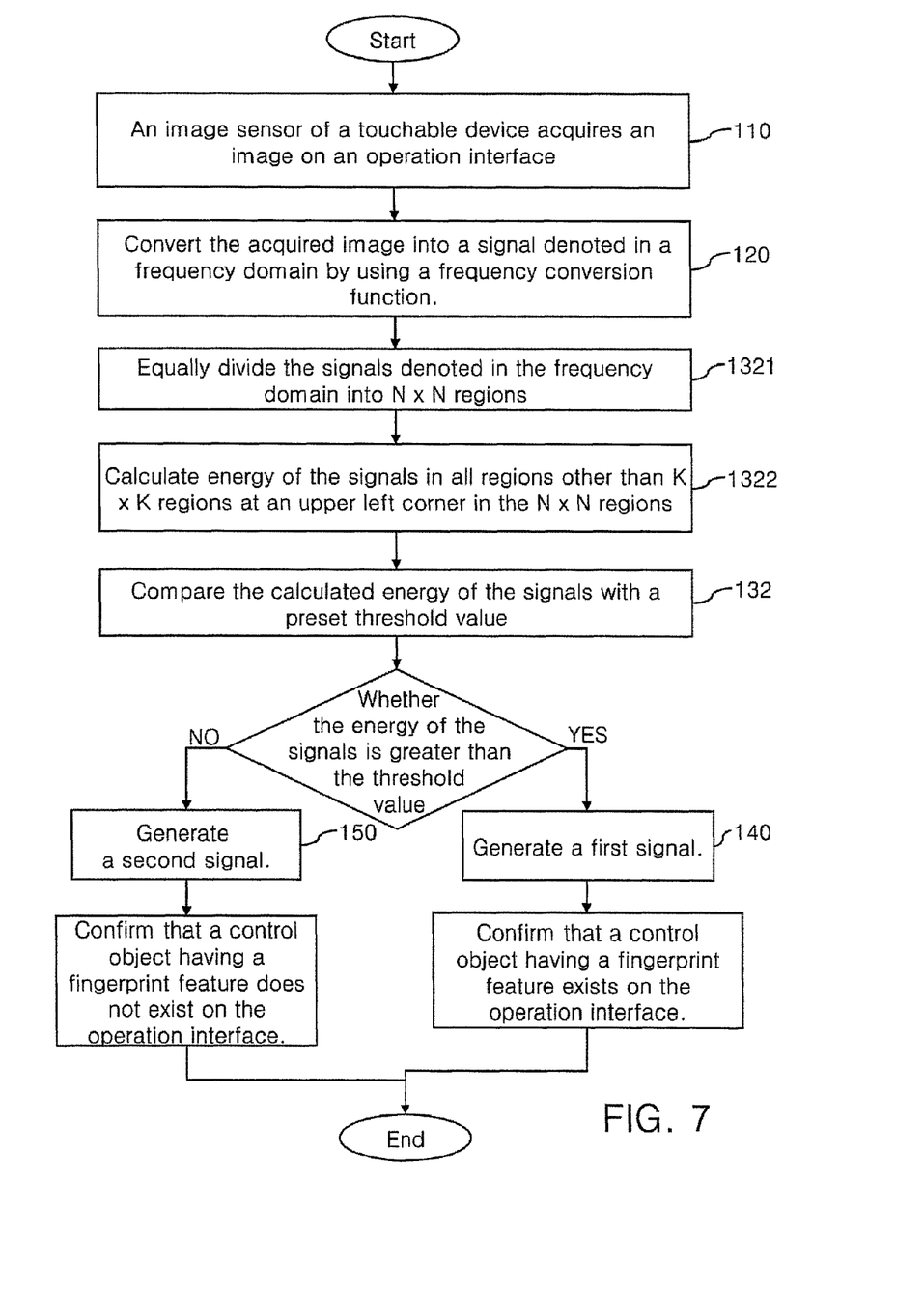
FIG. 7 is a flow chart of a method for detecting an object according to a fifth embodiment of the disclosure.

Referring to FIG. 7, in Step 132, the signals of the frequency domain can be equally divided into N×N regions (Step 1321), wherein N is an integer greater than 1, and K×K regions within the scope of the N×N regions are defined, wherein K is a positive integer smaller than N. Then energy of the signals other than signals in K×K regions at an upper left corner in the N×N regions is calculated (Step 1322). In other words, in the N×N regions, the frequencies decrease from right to left and from bottom to top.

Figure 8:
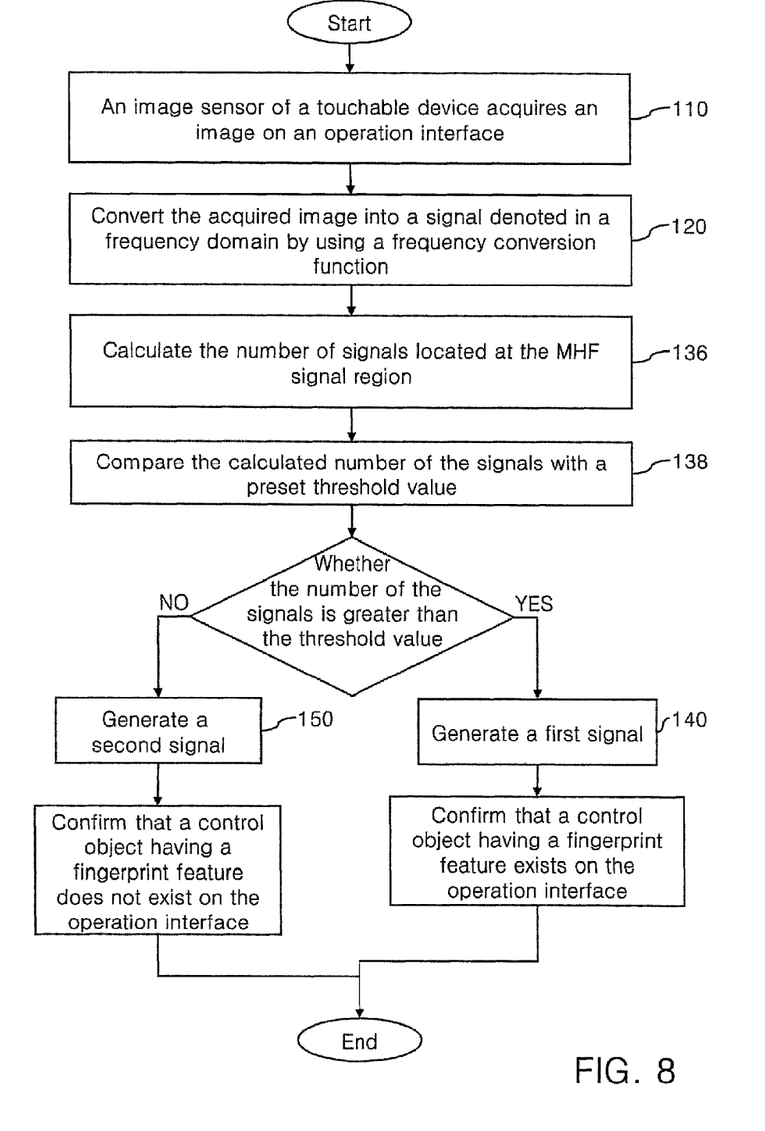
FIG. 8 is a flow chart of a method for detecting an object according to a sixth embodiment of the disclosure.

For the calculation of the number of the signals in the MHF signal region, referring to FIG. 8, the processor 230 can calculate the number of the signals located at the MHF signal region (Step 136) and compare the calculated number of the signals with the preset threshold value (Step 138). When the number of the signals is greater than the threshold value, the first signal is generated (Step 140), that is, the processor 230 confirms that the object exists on the operation interface, so the displacement detection corresponding to the image is performed normally. When the number of the signals is not greater than the threshold value, the second signal is generated (Step 150), that is, the processor 230 confirms that the object does not exist on the operation interface, so the displacement detection corresponding to the image is stopped or the output of the detected displacement amount is stopped.

Figure 9:
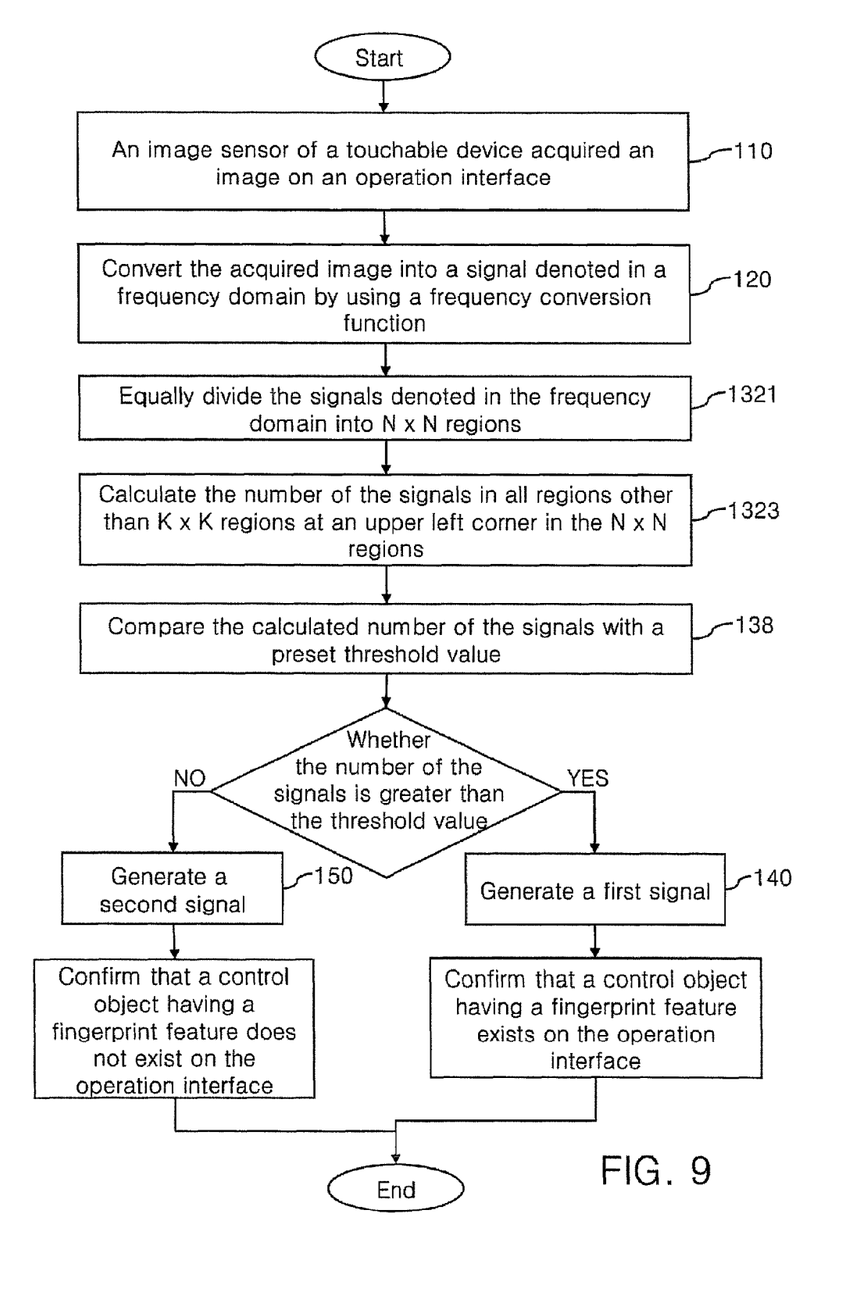
FIG. 9 is a flow chart of a method for detecting an object according to a seventh embodiment of the disclosure.

Referring to FIG. 9, in Step 132, the signals of the frequency domain can be equally divided into N×N regions (Step 1321), and then the number of the signals in all regions other than K×K regions at an upper left corner in the N×N regions is calculated (Step 1323). In other words, in the N×N regions, the frequencies decrease from right to left and from bottom to top.

In conclusion, the method for detecting the object and the touchable device according to the embodiments can be used for detecting the object on the operation interface of the touchable device, thereby avoiding track jitters caused by the external environment. Moreover, through the method for detecting the object and the touchable device according to the disclosure, the output of the displacement amount corresponding to the movement of the object (that is, detected track information) can be controlled according to whether the object exists on the operation interface.

The disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for detecting a object, applicable to a touchable device, for detecting the object having a fingerprint feature and placed on an operation interface of the touchable device, comprising:
    acquiring, by an image sensor of the touchable device, an image on the operation interface;
    converting, by a processor of the touchable device, the acquired image in a spatial domain into a signal of a frequency domain by using a frequency conversion function; and
    generating a first signal and a second signal according to a distribution of the signals of the frequency domain in a medium-high frequency (MHF) signal region, wherein the first signal indicates existence of the object on the operation interface, and the second signal indicates inexistence of the object on the operation interface.

2. The method according to claim 1, wherein the analyzing step comprises:
    calculating energy of signals in the MHF signal region;
    comparing the calculated energy of the signals with a threshold value; and
    generating the first signal when the energy of the signals is greater than the threshold value.

3. The method according to claim 2, wherein the calculating step comprises:
    equally dividing the signals of the frequency domain into N×N regions, wherein N is an integer greater than 1; and
    defining K×K regions within the scope of the N×N regions, wherein K is a positive integer smaller than N;
    calculating energy of the signals, other than signals in K×K regions, at an upper left corner of the N×N regions.

4. The method according to claim 1, wherein the analyzing step comprises:
    calculating a number of the signals at the MHF signal region;
    comparing the calculated number with a threshold value;
    generating the first signal when the number is greater than the threshold value; and
    generating the second signal when the number is not greater than the threshold value.

5. The method according to claim 1, wherein the frequency conversion function is one selected from Discrete Fourier Transform (DFT) function, a Discrete Cosine Transform (DCT) function, and a Discrete Wavelet Transform (DWT) function.

6. The method according to claim 1, further comprising:
    when the object exists on the operation interface, calculating a displacement amount of the object by using the acquired image in response to the first signal.

7. The method according to claim 1, further comprising:
    when the object exists on the operation interface, enabling a displacement sensor of the touchable device to output a displacement amount corresponding to a movement track of the object according to the first signal.

8. A touchable device, comprising:
    an operation interface;

an image sensor, configured corresponding to the operation interface, and for acquiring an image on the operation interface, the acquired image being in a spatial domain;

a processor, connected to the image sensor, and for determining whether an object having a fingerprint feature exists on the operation interface by converting the acquired image into a signal of a frequency domain and analyzing frequency components of the acquired image; and a track detector, connected to the processor, and for detecting a movement track of the object on the operation interface.

9. The touchable device according to claim 8, wherein the processor converts the acquired image into the signal of the frequency domain by using a frequency conversion function, and determines whether the object exists on the operation interface according to energy of the signals of the frequency domain in a medium-high frequency (MHF) signal region.

10. The touchable device according to claim 9, wherein the processor compares the energy of the signals in the MHF signal region with a threshold value, and determines that the object exists on the operation interface when the energy of the signals is greater than the threshold value.

11. The touchable device according to claim 8, wherein the processor converts the acquired image into the signal of the frequency domain by using a frequency conversion function, and determines whether the object exists on the operation interface according to a number of signals of the frequency domain in an MHF signal region.

12. The touchable device according to claim 11, wherein the processor compares the number of the signals located at the MHF signal region with a threshold value, and determines that the object exists on the operation interface when the number of the signals is greater than the threshold value.

13. The touchable device according to claim 8, wherein when the object exists on the operation interface, the processor enables the track detector to detect the movement track of the object.

14. The touchable device according to claim 8, wherein the track detector is a displacement sensor.

15. The touchable device according to claim 8, wherein the track detector is an image sensor.

16. A touchable device, comprising:
an operation interface;
an image sensor, configured corresponding to the operation interface, and for acquiring an image on the operation interface, the acquired image being in a spatial domain; and
a processor, connected to the image sensor, for determining whether an object having a fingerprint feature exists on the operation interface by converting the acquired image into a signal of a frequency domain and analyzing frequency components of the acquired image, and calculating a displacement amount of the object by using the acquired image when the object exists on the operation interface.

17. The touchable device according to claim 16, wherein the processor converts the acquired image into the signal in the frequency domain by using a frequency conversion function, and determines whether the object exists on the operation interface according to energy of signals in the frequency domain in a medium-high frequency (MHF) signal region signals of the frequency domain.

18. The touchable device according to claim 17, wherein the processor compares the energy of the signals located at the MHF signal region with a threshold value, and determines that the object exists on the operation interface when the energy of the signals is greater than the threshold value.

19. The touchable device according to claim 16, wherein the processor converts the acquired image into the signal in the frequency domain by using a frequency conversion function, and determines whether the object exists on the operation interface according to a number of signals in the frequency domain in an MHF signal region.

20. The touchable device according to claim 19, wherein the processor compares the number of the signals located at the MHF signal region with a threshold value, and confirms that the object exists on the operation interface when the number of the signals is greater than the threshold value.

* * * * *